United States Patent [19]

Wakeman

[11] 4,246,929
[45] Jan. 27, 1981

[54] TAMPER PROOF IDLE ADJUSTING SCREWS

[75] Inventor: Russell J. Wakeman, Madison Heights, Mich.

[73] Assignee: Colt Industries Operating Corp, New York, N.Y.

[21] Appl. No.: 876,884

[22] Filed: Feb. 13, 1978

[51] Int. Cl.³ .............................................. F16K 35/06
[52] U.S. Cl. ......................... 137/382; 261/DIG. 38; 137/384
[58] Field of Search ..................... 137/382, 383, 384; 251/89, 90, 215, 216; 261/DIG. 38; 222/153

[56] References Cited

U.S. PATENT DOCUMENTS

| 1,914,905 | 6/1933 | Barber ................................ 137/385 |
| 2,720,845 | 11/1955 | Whitlock, Jr. ...................... 251/216 |
| 3,166,292 | 1/1965 | Forman .............................. 251/215 |
| 3,325,064 | 6/1967 | Scheck ................................ 251/90 |
| 3,618,906 | 11/1971 | Charron ............................ 137/382.5 |

FOREIGN PATENT DOCUMENTS

| 2401803 | 9/1974 | Fed. Rep. of Germany ... 261/DIG. 38 |
| 2548226 | 5/1976 | Fed. Rep. of Germany ... 261/DIG. 38 |
| 2552100 | 2/1977 | Fed. Rep. of Germany ... 261/DIG. 38 |
| 2331691 | 9/1974 | France ............................ 261/DIG. 38 |
| 2352955 | 9/1975 | France ............................ 261/DIG. 38 |

*Primary Examiner*—Martin P. Schwadron
*Assistant Examiner*—A. Michael Chambers
*Attorney, Agent, or Firm*—Walter Potoroka, Sr.

[57] ABSTRACT

A fuel metering apparatus, for supplying metered fuel to an associated combustion engine, has an idle fuel metering and supply system comprising adjustable valving means which, in turn, comprises a discharge orifice means and cooperating valving member which is adjustably selectively positioned with respect to such orifice means in order to thereby establish a desired metered rate of fuel flow through the thusly determined effective flow area of the orifice means for a particular pressure differential thereacross; the adjustable valving member is generally contained within a cooperating body member or portion and access to the valving member, subsequent to it being selectively positioned, is prevented by closure members placed in position after the said selective positioning of said valving member.

7 Claims, 4 Drawing Figures

U.S. Patent
Jan. 27, 1981
4,246,929
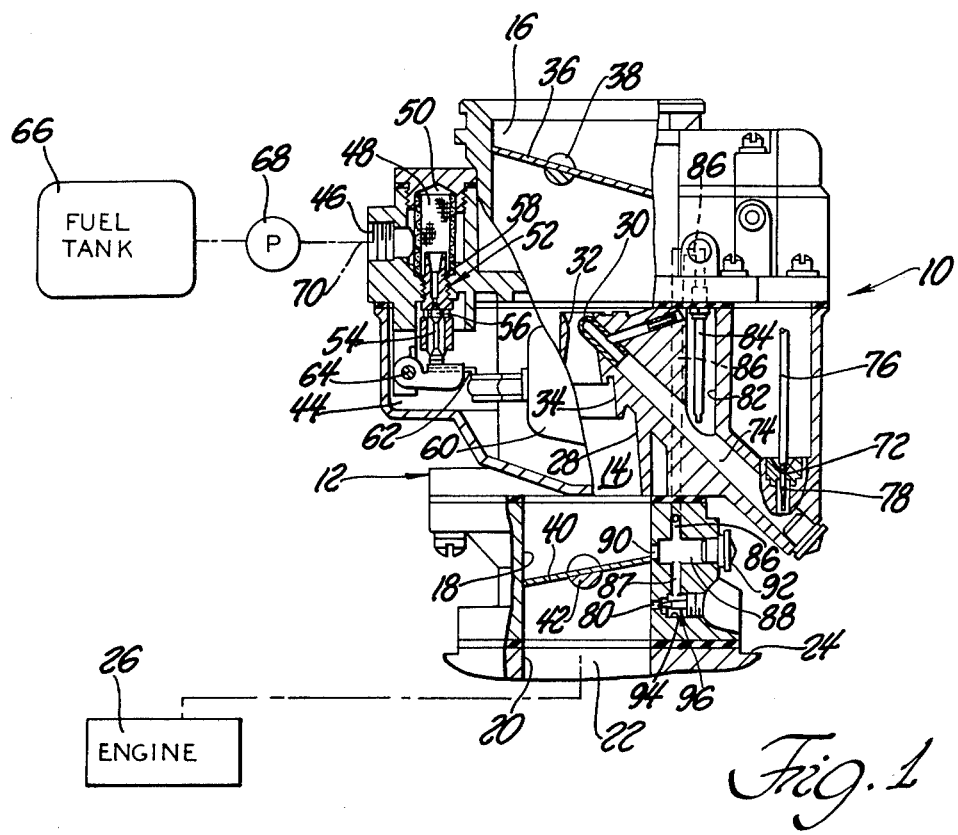
Fig. 1
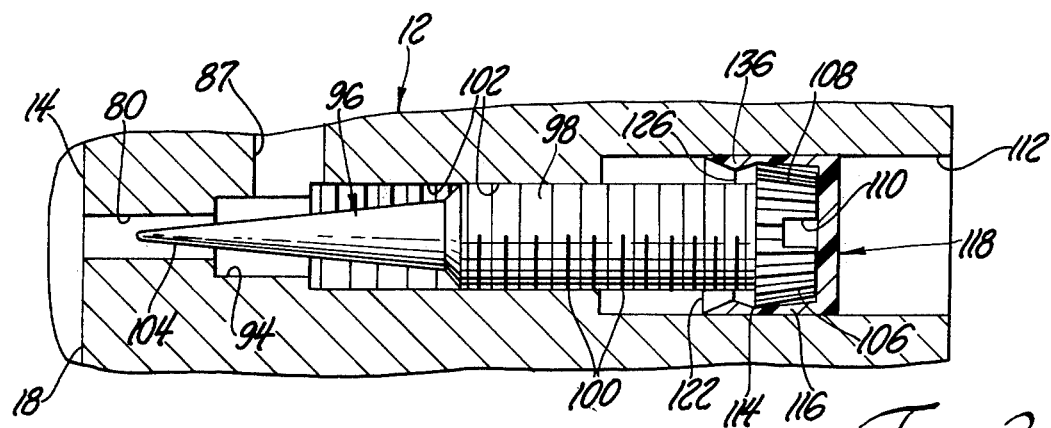
Fig. 2
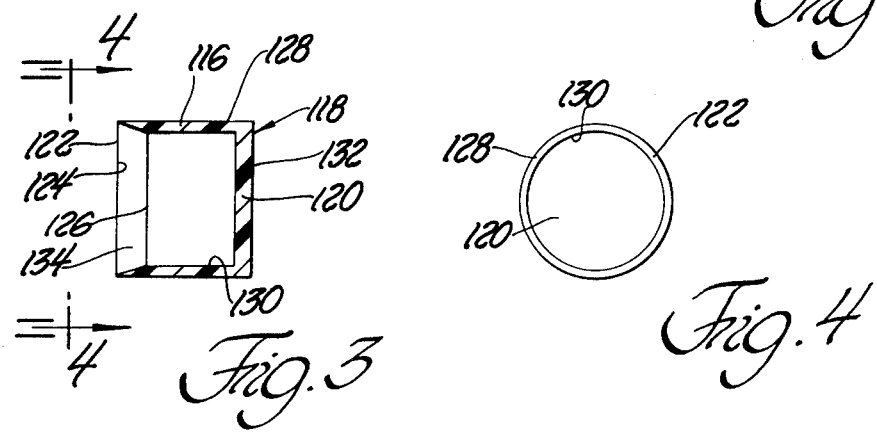
Fig. 3
Fig. 4

TAMPER PROOF IDLE ADJUSTING SCREWS

BACKGROUND OF THE INVENTION

Although the industry has made significant improvements in the field of fuel metering, various levels of government have, nevertheless, unilaterally established strict limits on vehicular engine exhaust emissions such as, for example, oxides of nitrogen, unburned hydrocarbons and carbon monoxide. There are, obviously, many influencing factors collectively determining the degree of such exhaust emissions from any particular vehicle and engine. For example, engine spark timing, mode of engine operation (whether hot or cold and whether accelerating or decelerating), fuel metering head in the fuel bowl, degree of pressure drop across air intake filter, and the general condition of the engine intake and exhaust valves are just some of the variables which will determine the degree of exhaust emission. The prior art has suggested various means, methods and apparatus for reducing exhaust emissions due to the aforementioned factors. However, even with the adoption of such proposals by the prior art, it has been found that problems still exist with regard to meeting such governmentally imposed limits of exhaust emissions.

It has now been discovered that there is another factor which can lead to increased exhaust emission regardless of how precisely or carefully the engine components are manufactured and regardless of how carefully and precisely the carburetor or other fuel metering device, to be used with such an engine, are manufactured and calibrated.

Such an additional factor is the unauthorized tampering with certain of the metering restrictions (which were precisely determined during manufacture) by individuals, after the carburetor or other fuel metering device has been sold and placed into actual use. Such individuals were found to often "adjust" the carburetor or other fuel metering device in order to obtain what they considered "better" engine performance.

This usually meant that they tried to obtain a richer (more) fuel flow to the engine than that as established by the engine and/or carburetor and/or fuel control manufacturer. The system within, for example, the carburetor which could be most easily manipulated by such individuals is the idle fuel system since it possessed an adjustable needle valve generally in or otherwise cooperating with the idle fuel discharge port.

The elimination of such adjustable needle valves would, in turn, create serious difficulties in attempting to properly calibrate the carburetor during its manufacture and, attendantly, greatly increase the cost thereof.

Accordingly, the invention as herein disclosed and claimed is primarily directed to the solution of the problems arising relative to and out of such adjustable needle-type valves as well as other related and attendant problems.

SUMMARY OF THE INVENTION

According to the invention, a fuel system for metering fuel to an associated engine and which comprises a needle valve cooperating with a discharge passage for thereby metering the rate of fuel flow through such discharge passage to said engine has body means defining the discharge passage as well as supporting said needle valve, and cover-like capping means are provided to preclude access to the needle-valve once such needle valve is selectively adjusted relative to the cooperating discharge passage.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be eliminated from one or more views:

FIG. 1 is a side elevational view illustrating a fuel control or metering apparatus, such as a carburetor, with parts thereof broken away and in cross-section, embodying teachings of the invention;

FIG. 2 is an enlarged axial cross-sectional view of a portion of the structure shown in FIG. 1;

FIG. 3 is an axial cross-sectional view of one of the elements shown in FIG. 2; and FIG. 4 is a view taken generally on the plane of line 4—4 of FIG. 3 and looking in the direction of the arrows.

DETAILED DESCRIPTION OF THE PREFERRED EMBODIMENT

Referring now in greater detail to the drawings, FIG. 1 illustrates fuel metering means such as a carburetor 10 having body means 12 through which is formed induction passage means 14 with an air inlet end 16 and a discharge end 18 which communicates with the inlet 20 of the intake passage means 22 of an associated inlet or intake manifold 24 of a related combustion engine 26. The induction passage means 14 may comprise venturi means 28 generally within which a main fuel discharge nozzle 30, comprising booster-like venturi means 32 and 34, is situated.

A choke valve 36, operable to regulate intake air flow, is suitably rotatably mounted on and to a choke shaft 38 suitable rotatably journalled in body means 12. Somewhat similarly a throttle valve 40 is located generally in the discharge end 18 of induction passage means 14 and suitably fixedly secured to a transversely extending rotatable throttle shaft 42 as to be thereby variably selectively positionable with the induction passage means as to accordingly control the flow of motive or combustible fluid from the fuel metering means 10 and into the intake passage means 22.

The body means 12 may be provided with a fuel bowl or reservoir 44 having a fuel inlet 46 provided as with a screen 48 situated within an inlet recess 50. Fuel inlet valving means 52 may comprise a needle-like valve member 54 having a tapered end 56 in displaceable contact with a cooperating valve seat of a valve body structure 58. A float member 60 having a float arm 62, pivotally mounted as at 64, is operatively connected to needle valve 54 as to thereby be effective for actuating needle valve 54 and maintain a generally constant fuel level within the fuel reservoir 44. Fuel may be supplied to the reservoir 44 as from a related fuel tank 66 and associated fuel pump means 68 situated in, as for example, interconnecting conduit means 70.

A fuel metering orifice 72 leads from the fuel bowl or reservoir 44 to an upwardly inclined main fuel passage 74 which terminates in the main fuel discharge nozzle 30 discharging as into the primary booster venturi 32. Fuel flow from the reservoir 44 through orifice 72 into the fuel passage 74 is controlled as by an associated metering rod 76 having a stepped or otherwise contoured end 78 positioned in the orifice 72 as to cooperate therewith in defining a variably selected effective metering area therebetween. Axial movement of rod 76 in order to position different portions of contoured end 78 in orifice 72 provides a change in the rate of metered fuel flow through such orifice means 72.

The carburetor or charge forming device 10 also comprises an idle fuel metering and supply system which may comprise idle fuel discharge port means 80 opening and discharging into induction passage means 14 downstream or posterior to throttle valve means 40. The idle system may also comprise an idle fuel well 82 communicating with and extending generally upwardly from the main fuel passage 74. The well 82 may generally surround a metering tube 84 which, as at its upper end, communicates with passage or conduit means 86. As shown, the idle conduit means 86 may communicate first with a chamber 88 and from there with idle port or passage 80 as by a conduit portion 87. Chamber 88, in turn, is placed in communication with the induction passage means 14 as by aperture or slot means 90 situated generally upstream of the throttle valve 40, when closed, as to thereby become progressively opened to communication with the downstream portion of the induction passage means 14 as throttle valve 40 is progressively opened from its curb idle condition. After formation of chamber 88, the outer end thereof may be closed or sealed as by suitable access-like closure means 92. As can be seen in FIG. 1, idle fuel passage 87 extends downwardly as to communicate with discharge conduit or aperture means 80 through an intermediate chamber-like portion 94 which, in turn, generally encompasses an adjustable valve member 96.

Referring now in greater detail to FIGS. 2 and 3, valve member 96 may comprise a body portion 98 which has an externally threaded portion 100 threadably engaging an internally threaded portion 102 carried as within body or housing means 12. Generally axially coextensive with body 98 is a needle-like or otherwise contoured valving surface 104 carried at the end of body 98 and effective for cooperating with discharge orifice means 80 for establishing a desired effective metering flow area therethrough.

Valve member 96 is also preferably provided with a head-like portion 106 which, further, in its preferred form, is of a frusto-conical configuration and has its outer surface formed as by a plurality of generally axially directed grooves or recesses 108 or suitably knurled. A slot 110 is effective for operatively engaging the blade of a corresponding screw-driver, or some other functionally equivalent tool, whereby the valve member 96 may be threadably rotated as to thereby result in valving surface 104 being adjustably located at the desired position relative to orifice means 80.

As shown in FIG. 2, the head portion 106 is received within a counterbore or passage 112 formed in housing or body means 12. Passageway 112 is of a dimension, diametrically, slightly larger than the largest effective diameter of head 106 as at, for example, 114. The generally annular space or clearance thereby defined therebetween permits the insertion therethrough of the generally annular wall portion 116 of related capping or closure means 118.

Referring to FIGS. 3 and 4, the preferred embodiment of cap means 118 is illustrated as comprising a generally annular wall 116, defining a tubular portion, which is integrally formed with an axial end wall 120. Generally, cap or closure member 118 may be considered as being of cup-shaped configuration having an open end 122. In the preferred embodiment the inner surface of the annular wall 116, nearer the open end 122, is formed as to be of a generally conical configuration having its larger opening or diameter 124 as at the said open end 122 and its smaller opening or diameter spaced axially inwardly from the open end 122 as at 126.

In the practice of the invention, it is preferred that the diameter of the outer surface 128 of cap 118 be dimensionally closely equivalent to that of the diameter of bore 112 and that the diameter of the inner surface 130 of cap 118 be dimensionally smaller than the largest diameter of valve head 106. Cap or cover 118 may be formed of any suitable material such as, for example: nylon, lead or brass and especially those materials which have some perceptible degree of resiliency.

Referring to FIGS. 2, 3 and 4, let it be assumed that the needle valve 96 has been inserted and selectively adjusted relative to passage 80 as to obtain the desired metering characteristics through passage means 80. At that time a cap or closure member 118, as shown in FIGS. 3 and 4, would be inserted into bore 112 and then, as by means of suitable tool (not shown) which may have a flat surface abutting end wall 120 outer surface 132, moved axially along bore 112 toward the left (as viewed in FIG. 2) ultimately causing head 106 to start to be received within cup 118. When the cup or capping member 118 is moved sufficiently toward the left, the open end 122 first starts to pass through the relatively narrow annular space as between bore 112 and head diameter 114 and to that extent the inner conical lead or ramp-like surface 134 of cap 118 assists in the wall 116 starting its movement into and through the said narrow annular space. As such leftward movement of cap 118 continues, the larger diameter 114 of valve head 106 starts to radially outwardly compress, in an ironing-like fashion, the annular wall 116 and as axially incremental portions of such wall 116 pass to the left (as viewed in FIG. 2) of the valve head diameter 114 such incremental portions again move radially inwardly thereby, when cap 118 is made of relatively resilient material, having a generally radially inwardly directed annular portion, as depicted at 136 of FIG. 2, which serves generally as an abutment or restraining portion effectively resisting the withdrawal of cap 118 in a direction opposite to that described. The leftward movement of cap 118 would continue until the wall 120 thereof is seated against the juxtaposed end of valve head 106.

With materials which are relatively less resilient such as, for example, brass, the same general effect would be realized. That is, it is well known that any metal will expand to some measurable degree immediately after it experiences compression. This is a well known phenomenon in, for example, machine tool metal cutting where often a hole, upon having a reamer tool removed therefrom, is of a diameter smaller than the diameter of the reamer tool which passed through that hole.

Accordingly, even the slight expansion of such metal, in embodiments of a cap 118 made of metal, is sufficient to result in an effective interference with the larger diameter of valve head 106 in any attempt to withdraw the cap 118 from bore 112. Further, if, as in the preferred arrangement, the surface 108 is knurled or otherwise functionally equivalently textured, the relative irregularity thereof and the somewhat random edges defining the texturized surface tend to cut into and mechanically hold the cup 118 against withdrawal.

Although not considered necessary, nevertheless, it is preferred that the cap or cover 118 be used in cooperation and conjunction with a valving member 96 which has a head portion which tapers, in a manner depicted as to further assist in passing the cup 118 thereabout.

As should be apparent, once valve member 96 is properly adjusted and the closure member 118 is placed as generally depicted, the valve member 96 becomes effectively totally enclosed and cannot be tampered with thereby assuring that the metering calibration established by the valving member 96 and as set by the manufacturer will be maintained. In the preferred embodiment and arrangement wall 132 will, at its periphery, fully contact the juxtaposed surface of bore or recess 112 thereby effectively precluding the grasping of any surface in an attempt to withdraw the cap means 118. Further, by placing the cover or closure means 118 some significant distance inwardly of the open end of recess 112, it becomes extremely difficult to even attempt removal of such closure means 118 by the insertion into passage 112 of any related tool. This becomes especially evident when one considers that often the passage 112 may have a relatively small diameter as, for example, in the order of 0.25 inch.

Although only one preferred embodiment of the invention has been disclosed and described, it is apparent that other embodiments and modifications of the invention are possible within the scope of the appended claims.

I claim:

1. A fuel metering system effective for metering the rate of fuel flow to an associated combustion engine, comprising body means, conduit means formed in said body means communicating with a source of fuel, orifice means formed generally in said body means for receiving fuel from said conduit means and discharging said fuel into induction passage means associated with said engine, an opening formed in said body means, said opening receiving adjustably positionable valve means, said valving means being selectively adjustably positionable with respect to said orifice means in order to thereby cooperate with said orifice means in order to cooperatingly define an effective metering area for metering said rate of said fuel flow from said conduit means and to said induction passage means, and separate closure means formed from a resilient, non-fragile material and press fitted into said opening after low torque adjustment of said valving means as to effectively close said opening to access to said valving means, said closure means comprising generally tubular body means received generally between said valving means and said opening, and an end wall portion carried by said tubular body means and covering an end of said valving means, said closure means being positioned upon application thereof so as to be recessed within said opening to conceal the presence of said valving means and simulate an ordinary body plug and to not be easily removable with hand tools, said end wall forming the bottom of said opening, said opening formed in said body means comprising an opening inner surface, said closure means comprising outer closure surfaces means and inner closure surface means, at least a major portion of said outer closure surface means engaging said opening inner surface, and said inner closure surface means engaging said adjustably positionable valving means, said tubular body means also providing a continuous press-fit airtight seal to prevent vacuum leaks from said induction passage past said valve means to said opening, said press fit also providing axial retention of said valving means so as to maintain initial adjustment thereof.

2. A fuel metering system according to claim 1 wherein said end of said valving means comprises a relatively enlarged head-like portion, wherein said head-like portion has an outer elevational configuration comprising a truncated cone, and wherein said tubular body means extends inwardly of said opening a distance beyond said truncated cone.

3. A fuel metering system according to claim 2 wherein said truncated cone has an outer conical surface which is textured as to be other than smooth.

4. A fuel metering system according to claim 1 wherein said end of said valving means comprises a relatively enlarged head-like portion, wherein said head-like portion has an outer surface which is textured as to be other than smooth, and wherein said tubular body means extends inwardly of said opening a distance beyond said head-like portion.

5. A fuel metering system according to claim 1 wherein said tubular body means is relatively resiliently deflectable.

6. A fuel metering system according to claim 1 wherein said tubular body means and said end wall portion are integrally formed with each other, and wherein said tubular body means and said end wall portion are formed of relatively resilient material.

7. A fuel metering system according to claim 6 wherein said relatively resilient material comprises nylon.

* * * * *